United States Patent [19]

Hausdorf et al.

[11] Patent Number: 4,699,945
[45] Date of Patent: Oct. 13, 1987

[54] SELF-ADHESIVE COATING FOR POLYPROPYLENE FOAM MATERIALS

[75] Inventors: Jörg Hausdorf, Mörlenbach; Joachim Kändler, Weinheim; Volker Siekermann, Fürth; Wilfried Getrost, Mörlenbach, all of Fed. Rep. of Germany

[73] Assignee: Firma Carl Freudenberg, Weinheim/Bergstr., Fed. Rep. of Germany

[21] Appl. No.: 842,551

[22] Filed: Mar. 21, 1986

[30] Foreign Application Priority Data

Apr. 26, 1985 [DE] Fed. Rep. of Germany ....... 3515097

[51] Int. Cl.$^4$ ................ C08L 33/02; C08L 61/06; C08L 61/24
[52] U.S. Cl. .................................... 524/512; 524/510
[58] Field of Search ............................... 524/510, 512

[56] References Cited

U.S. PATENT DOCUMENTS 3,085,074  4/1963  Burke ..................... 524/510

FOREIGN PATENT DOCUMENTS 693428     9/1964  Canada .................. 524/510
59-124969  7/1984  Japan ................... 524/510
60-135471  7/1985  Japan ................... 524/510

Primary Examiner—C. Warren Ivy
Attorney, Agent, or Firm—Felfe & Lynch

[57] ABSTRACT

Disclosed is a self-adhesive coating for polypropylene foams. The coating is the chemical crosslinking product of 2-chlorobutadiene/methacrylic acid copolymer and a prepolymer of an aminoplastic or phenolic plastic containing methylol groups.

9 Claims, No Drawings

SELF-ADHESIVE COATING FOR POLYPROPYLENE FOAM MATERIALS

BACKGROUND OF THE INVENTION

The invention relates to a self-adhesive coating for polypropylene foam materials, especially for postformable soundproofing moldings in motor vehicle construction. These moldings consist of pelleted matrix foams and they have the best sound absorbing qualities at the present time.

However, the resulting moldings have mechanically delicate surfaces, are easy flammable and undesirably soften when in contact with diesel fuels. These characteristics are highly undesirable.

In the present state of the art, these deficiencies have not been satisfactorily eliminated for polyolefins, especially polypropylene. Since modification of the foam composition has not produced satisfactory results, coatings containing flame-retardant additives, e.g., on the basis of chlorinated polyethylene, polyvinyl acetate, polyvinyl chloride or polyurethane, have been applied to polyolefin surfaces to protect them. None of the known materials, however, are sufficiently resistant to diesel fuel. Further, the proposed coatings have poor adhesive properties are very poor especially on polypropylene foam surfaces that are to be postformed. Pretreatment with an adhesion-mediating agent (primer) before bonding has not produced satisfactory results.

The object of the present invention is to overcome the above drawbacks of prior art techniques by use of a flame-retardant coating for polypropylene foam materials which is resistant to diesel fuel, provides protection against mechanical and chemical attack, will have better postforming qualities, and which will adhere securely to the surface of the foamed materials without the use of a primer, while maintaining the good sound proofing qualities of polypropylene foam.

THE INVENTION

It has surprisingly been found that the objectives of the invention can be obtained by a coating formed from the chemical crosslinking mixture of an aqueous, colloidal dispersion of a copolymer of 2-chlorobutadiene and methacrylic acid with an aqueous, methylol-group-containing dispersion of an aminoplastic or phenolic plastic precondensate. The coating can additionally contain the known flame-retardants, preferably Sb$_2$O$_3$ or alumina trihydrate, and working additives, such as antifoaming agents and thickeners, without diminishing its adhesivity or post-forming properties.

One of the reaction components of the crosslinking product of the invention is an aqueous, colloidal dispersion of a copolymer of 2-chlorobutadiene (96% b.w.) and methacrylic acid (4% b.w.). Such a dispersion is, for example, commercially obtainable as a 50% dispersion under the name, "Baypren-Latex 4R" (a Bayer product).

The suitability of this dispersion for coatings and for duplexing and adhesive purposes, as well as the good resistance of these vulcanizates to aging, ozone, gasoline and mineral oil, are known. However, it is also known that such coatings do not adhere to polypropylene foam surfaces, and therefore render post-forming of the laminate impossible. The chemical reaction of the crosslinking of the methacrylate groups of the above described reaction component with an aminoplastic or phenolic plastic precondensate containing methylol groups, for example 4 moles of formaldehyde, 2 moles of methanol and 1 mole of melamine, surprisingly results in a coating according to the invention. This coating is susceptible to deep drawing and is self-adherent to unprimed polypropylene foam surfaces.

The new coating in every instance meets or exceeds the required tenacity and adhesivity, commonly tested by simply drawing off the coating by hand, and mineral oil penetration resistance. The addition of flame-retardant agents is possible, with no loss of the desirable properties of the product. Another advantage of the new coating is that one can dispense entirely with the use of sulfur and vulcanization accelerators. The product according to the invention will be further described below with the aid of examples of its formulation, without thereby narrowing the scope of the invention.

| EXAMPLES OF FORMULATION | | | | |
|---|---|---|---|---|
| | Parts by weight in the total mixture | | | |
| | Examples for comparison | | Examples of the invention | |
| | 1 | 2 | 3 | 4 |
| Polymer of 2-chlorobutadiene, 50% aqueous dispersion | 200 | — | — | — |
| Copolymer of 2-chlorobutadiene and methacrylic acid, 50% aqueous dispersion | — | 200 | 200 | 200 |
| Melamine-formaldehyde condensation product containing methylol groups, 50% aqueous dispersion | 25 | — | 25 | — |
| Urea-formaldehyde condensation product containing methylol groups, 40% aqueous dispersion | — | — | — | 30 |
| Zinc oxide | 8 | 8 | — | 8 |
| Sulfur and vulcanization accelerators | 2.5 | 2.5 | — | — |
| Antioxidants | 2.0 | 2.0 | — | 2.0 |
| Antimony trioxide | 10 | 10 | 10 | 15 |
| Alumina trihydrate | — | 10 | 10 | — |
| Thickeners | 5 | 5 | 5 | 5 |
| Antifoaming agents | 0.25 | 0.25 | 0.25 | 0.25 |
| Peeling force (Adhesivity to polypropylene foam), N/cm, measured by a tensile tester | <0.3 | <0.3 | 15–20 | 15–20 |

The components were intimately mixed in a high-speed stirrer and adjusted with the thickener to a viscosity of 10,000 to 20,000 cP. The coating was performed by application to the foam webs with a spray gun, brushes or spreaders in the desired thickness (e.g., 25 or 40 grams per square meter) and dried at a temperature between 60° and 100° C. Blanks were prepared, and were postformed, e.g., deep-drawn, at 200° C. Only the coatings of Examples 3 and 4 according to the invention adhere tightly by themselves, without any cement, to the polypropylene foam, but those of Examples 1 and 2 given for comparison can be easily pulled off.

The coating according to the invention provides the foam with a stable, resilient surface, resistance to diesel fuel, and flame-retardancy (e.g., self-extinguishing according to U.S. Motor Vehicle Standard MVSS 302), which is desirable especially for soundproofing molded products of polypropylene.

It will be understood that the specification and examples are illustrative but not limitative of the present invention in that other embodiments within the spirit and scope of the invention will suggest themselves to those skilled in the art.

We claim:

1. A self-adhesive coating for polypropylene foam materials, comprising the chemical crosslinking product of:
   an aqueous, colloidal dispersion of a copolymer with an aqueous, methylol-group-containing dispersion of an aminoplastic or phenolic plastic precondensate wherein the copolymer is 96 wt.% 2-chlorobutadiene and 4 wt.% methacrylic acid.

2. The coating of claim 1 further comprising flame-retardants.

3. The coating of claim 2 further comprising working additives.

4. The coating of claim 1 wherein the aminoplastic precondensate is a urea-formaldehyde condensation product.

5. The coating of claim 3 wherein the aminoplastic precondensate is a urea-formaldehyde condensation product.

6. A self-adhesive coating for polypropylene foam materials, comprising the chemical crosslinking product of:
   an aqueous, colloidal dispersion of a copolymer with an aqueous, methylol-group-containing dispersion of a melamine formaldehyde condensation product wherein the copolymer is 96 wt.% 2-chlorobutadiene and 4 wt.% methacrylic acid.

7. The coating of claim 6 further comprising flame-retardants.

8. The coating of claim 6 further comprising working additives.

9. The coating of claim 7 further comprising working additives.

* * * * *